United States Patent [19]

Kanekol

[11] Patent Number: 4,739,376
[45] Date of Patent: Apr. 19, 1988

[54] COPYING MACHINE

[75] Inventor: Tamaki Kanekol, Fujisawa, Japan

[73] Assignee: Ricoh Company, Ltd., Tokyo, Japan

[21] Appl. No.: 12,487

[22] Filed: Feb. 9, 1987

[30] Foreign Application Priority Data

Feb. 10, 1986 [JP] Japan .................................. 61-27710
Feb. 17, 1986 [JP] Japan .................................. 61-32413
Feb. 17, 1986 [JP] Japan .................................. 61-32414

[51] Int. Cl.4 ............................................. G03B 27/62
[52] U.S. Cl. ................................... 355/75; 355/3 SH; 355/50
[58] Field of Search ................... 355/8, 11, 50, 51, 57, 355/3 SH, 14 SH, 72, 75, 76

[56] References Cited

U.S. PATENT DOCUMENTS 4,660,957  4/1987  Ueda et al. .................. 355/50 X Primary Examiner—Richard A. Wintercorn
Attorney, Agent, or Firm—Oblon, Fisher, Spivak, McClelland & Maier

[57] ABSTRACT

A document presser plate and an automatic document feeder are disposed on a document support table which places a document to be copied thereon. A common driver gear is disposed in a copying machine mechanism for selectively reciprocally moving the document support table and actuating the automatic document feeder. A document on the document support table and a document in the automatic document feeder are exposed to light via a single exposure optical system in the copying machine mechanism.

5 Claims, 4 Drawing Sheets

COPYING MACHINE

BACKGROUND OF THE INVENTION

1. Field of the Invention

The present invention relates to a copying machine having a document presser plate and an automatic document feeder on a document support table.

2. Description of the Prior Art

Various types of copying machines are known in which an openable closure body having a document presser plate and an automatic document feeder is disposed over a document support table known as "contact glass" for placing a document thereon, the closure body being openable and closable over the document support table. There is a mode of operation in which only the document presser plate is used and the automatic document feeder is not used. When the closure body is to be opened and closed in such an operation mode, a large manual force is required since the automatic document feeder must also be moved with the closure body.

In view of the above problem, there has been proposed a copying machine structure having an automatic document feeder disposed separately from a document support table that is reciprocally movable with a book-like or sheet-like document placed thereon. In such a copying machine structure, exposure optical systems are associated respectively with the document support table and the automatic document feeder, or alternately, driver means are provided for the document support table and the automatic document feeder, respectively, for reciprocating movement thereof. This arrangement is however complex and requires a large number of parts which make the copying machine less reliable and also render its servicing less efficient. Another problem is that the exposure optical systems and the driver means take up a large space, resulting in an increased overall size of the copying machine.

A different copying machine has also been proposed in which an automatic document feeder of an integral construction is disposed on a document support table in a position outside of the range in which a document presser plate is openable and closable. The automatic document feeder includes a driver means for controlling operation of the automatic document feeder. More specifically, the automatic document feeder includes a motor and a power transmission system for transmitting power from the motor to feeder rollers, the power transmission system including a clutch. The motor is electrically connected by cables to a power supply and a control unit within the copying machine. When the automatic document feeder is reciprocally moved with the document support table, the cables tend to creep and may be cut off. The cables are required to be so arranged that they are not exposed outside of the copying machine.

In addition, the clutch included in the power transmission system comprises an expensive electromagnetic clutch for selectively transmitting and cutting off the motor power. Therefore, the cost of the copying machine is high.

SUMMARY OF THE INVENTION

It is therefore an object of the present invention to provide a copying machine arranged to use either one of a document presser plate and an automatic document feeder at a time.

Another object of the present invention is to provide a copying machine including an exposure optical system and a driver means, which are simple in structure, for use with a document presser plate and an automatic document feeder.

Still another object of the present invention is to provide a copying machine which is of a low cost.

To accomplish the above objects, a copying machine of the present invention has one exposure optical system and one driver means. The driver means operates a first power transmission system for reciprocally moving a document support table with respect to an exposure area, and also operates a second power transmission system for feeding a document with respect to the exposure optical system at the same speed as that of the document support table. The first and second power transmission systems are selectively operated in a mode in which a document presser plate is used (presser plate mode) and a mode in which an automatic document feeder is used (ADF mode). Therefore, the driver means is shared by the first and second power transmission systems, and a document placed on the document support table and a document fed by the automatic document feeder are exposed by the single exposure optical system.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
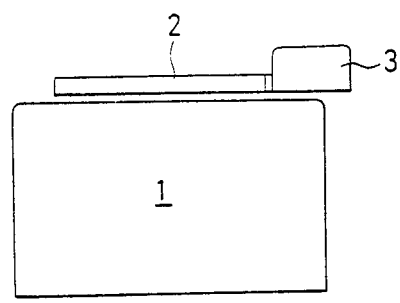
FIG. 1 is a schematic side elevational view of a copying machine according to the present invention.

As shown in FIG. 1, a copying machine according to the present invention primarily comprises a copying machine mechanism 1, a document presser plate 2, and an automatic document feeder 3.

Figure 2:
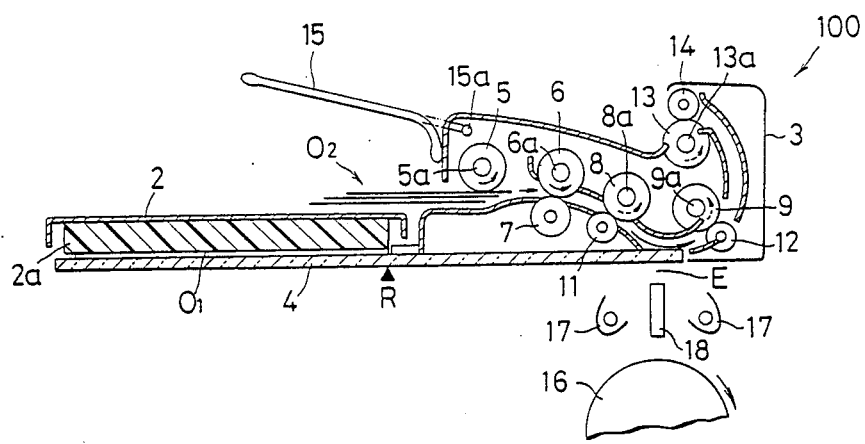
FIG. 2 is a cross-sectional view of an upper portion of the copying machine shown in FIG. 1.

As illustrated in FIG. 2, a document support table 4 known as "contact glass" is fixedly disposed in an upper portion of the copying machine mechanism 1 for placing a document to be copied thereon. The document presser plate 2 is positioned over the document support table 4 and has a cushioning pad 2a on its surface facing the document support table 4. The document presser plate 2 is hinged to the document support table 4 at its end remote from the viewer of FIG. 2. The opposite end of the document presser plate 2, closer to the viewer of FIG. 2, is vertically movable so as to open and close the document presser plate 2 with respect to the upper surface of the document support table 4.

When the document presser plate 2 is closed, i.e., brought down against the document support table 4, a document 01 is pressed down by the document presser plate 2 and set against the document support table 4.

The automatic document feeder 3 is disposed on the document support table 4 and positioned outside of the range in which the document presser plate 2 is opened and closed. The automatic document feeder 3 is integrally combined with the document support table 4. The automatic document feeder 3 has a document delivery system for introducing a document into the automatic document feeder 3, a document feeding system for feeding a document through the automatic document feeder 3, and a document discharging system for discharging a document out of the automatic document feeder 3.

As shown in FIG. 2, the document delivery system includes a rotatable delivery roller 5, a rotatable separation roller 6, and a check roller 7 positioned beneath and held against the separation roller 6 for preventing lower documents from being fed from a document stack 02.

The document feeding system includes a first rotatable feed roller 8, a second rotatable feed roller 9, and driven rollers 11, 12 held against the first and second feed rollers 8, 9, respectively.

The document discharging system has a rotatable discharging roller 13 and a driven roller 14 held against the discharging roller 13. A tray 15 for receiving documents discharged from the document discharging system is positioned on an extension of the path in which the documents are discharged by the rollers 13, 14, the tray 15 being angularly movable about a pivot shaft 15a.

Figure 3:
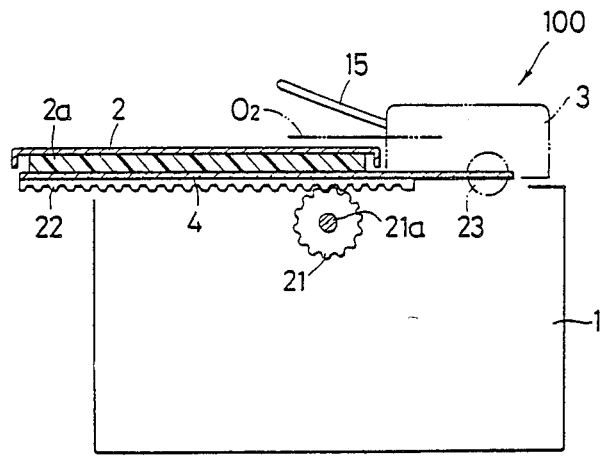
FIG. 3 is a cross-sectional view of a structure for reciprocally moving a document support table in the copying machine illustrated in FIG. 1.

As illustrated in FIG. 3, the copying machine mechanism 1 includes a driver gear 21 rotatable selectively in opposite directions by a motor 20 (FIG. 7) disposed in the copying machine mechanism 1. The document presser plate 2, the automatic document feeder 3, and the document support table 4 are combined into a unitary assembly which will hereinafter be referred to as a scanning movable unit 100. The scanning movable unit 100 has a fixed rack 22 capable of meshing with the driver gear 21 and a driven gear 23 capable of meshing with the driver gear 21. The rack 22 serves as a first power transmission system for reciprocally moving the document support table 4 of the scanning movable unit 100. The driver gear 21 can mesh with either the rack 22 or the driven gear 23 when the scanning movable unit 100 is manually moved laterally.

Figure 7:
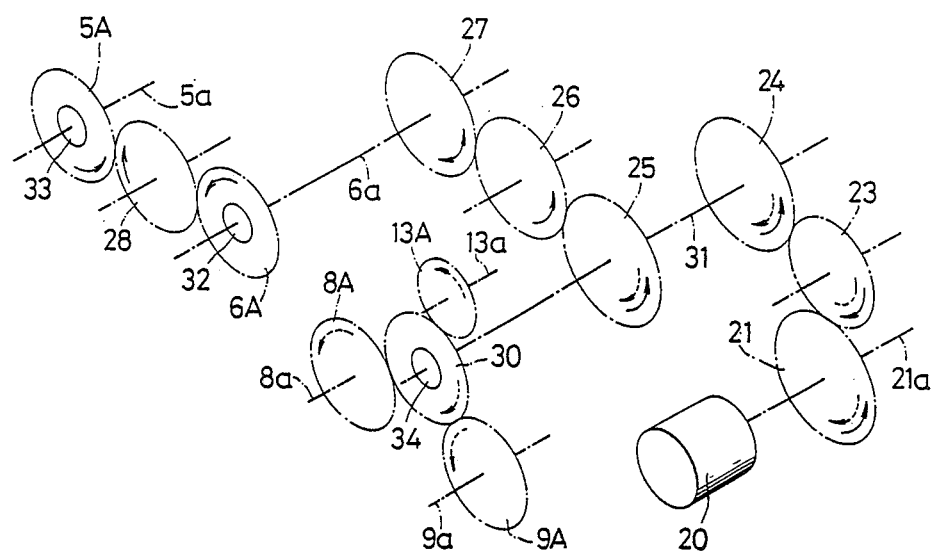
FIG. 7 is a schematic perspective view of a driver mechanism for driving the automatic document feeder illustrated in FIG. 2.

FIG. 7 shows a combination of gears for driving the rollers of the document delivery and feeding systems. In FIG. 7, the driven gear 23 is shown as meshing with the driver gear 21. The driven gear 23 is in mesh with a gear 24 mounted on an intermediate shaft 31 supporting a gear 25 meshing with a gear 26 held in mesh with a gear 27 supported on a shaft 6a on which the separation roller 6 is mounted. On the roller shaft 6a, there is mounted a one-way clutch 32 supporting a gear 6A meshing with a gear 28 held in mesh with a gear 5A mounted by a first one-way clutch 33 on a shaft 5a on which the document delivery roller 5 is supported.

A gear 30 mounted on the intermediate shaft 31 and having a second one-way clutch 34 is held in mesh with a gear 8A mounted on a shaft 8a on which the first feed roller 8 is mounted, a gear 9A mounted on a shaft 9a on which the second feed roller 9 is mounted, and a gear 13A mounted on a shaft 13a on which the discharging roller 13 is mounted. The gears shown in FIG. 7, except for the driver gear 21, are disposed in the scanning movable unit 100 and serve as a second power transmission system.

When the driven gear 23 meshes with the driver gear 21, as shown in FIG. 7, the driven gear 23 can be rotated selectively in opposite directions as the driver gear 21 is rotated. The delivery roller 5 is caused by the one-way clutch 33 to rotate only counterclockwise as indicated by the arrow (FIG. 2). Likewise, the separation roller 6 is caused by the one-way clutch 32 to rotate only counterclockwise as indicated by the arrow (FIG. 2), and the first and second feed rollers 8, 9 and the discharging rollers 13 are caused by the second one-way clutch 34 to rotate only counterclockwise as indicated by the arrows (FIG. 2).

Figure 4:
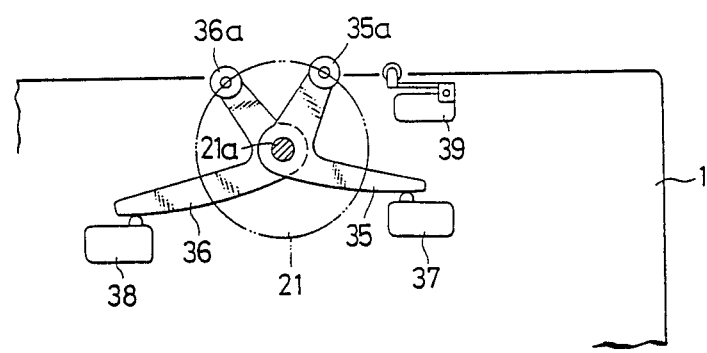
FIG. 4 is a side elevational view of a switch construction for changing the directions of reciprocating movement of the document support table of FIG. 3.

As illustrated in FIG. 4, two arms 35, 36 are independently swingably mounted on the shaft 21a for acting respectively on switches 37, 38 mounted in the copying machine mechanism 1. The arms 35, 36 have follower rollers 35a, 36a, respectively, on their ends remote from the switches 37, 38. Another switch 39 is disposed in the copying machine mechanism 1 and has an actuator projecting toward the lower surface of the scanning movable unit 100.

Figure 5:
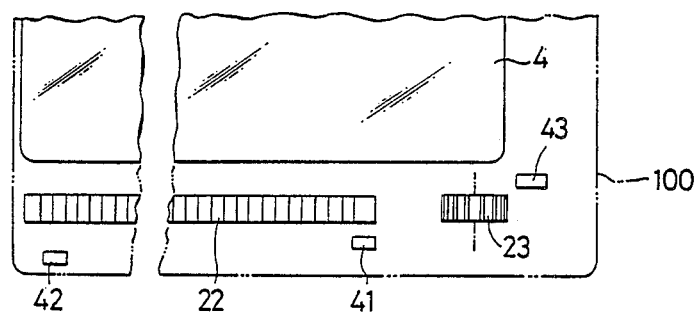
FIG. 5 is a fragmentary rear view of an area including the document support table fo FIG. 3.
Figure 6:
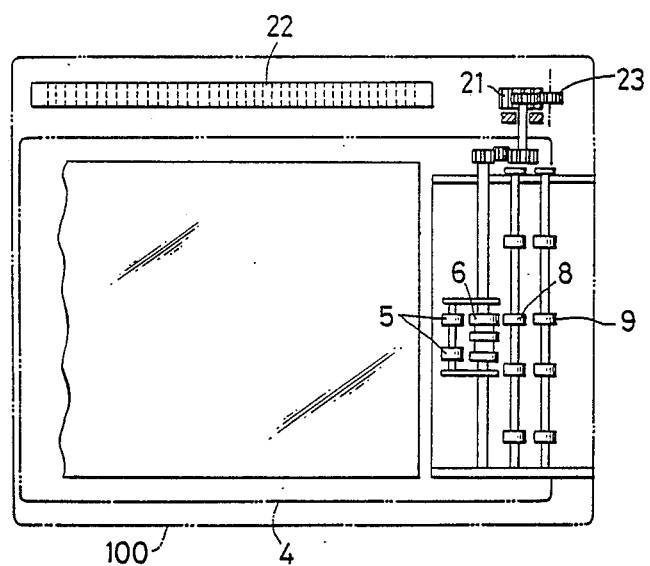
FIG. 6 is a plan view of the document suport table and an automatic document feeder.

The scanning movable unit 100 is viewed from below in FIG. 5. The scanning movable unit 100 has three projections 41, 42, 43 projecting downwardly for engaging the follower rollers 35a, 35b and the actuator of the switch 39. The projection 43 serves to actuate the switch 39 for selectively operating the first and second power transmission systems. The scanning movable unit 100 is viewed from above in FIG. 6.

Operation of the copying machine for copying a document 01 placed on the document support table 4 as shown in FIG. 2 will first be described below.

In such an operation mode, the document presser plate 2 is used. Generally, documents are copied in this mode, and particularly when certain pages of a book are to be copied, the copying machine must be operated in this mode.

In this mode, the tray 15 of FIG. 2 is turned clockwise about the pivot shaft 15a, and then the rack 22 is brought into mesh with the driver gear 21 as shown in FIG. 3. The driver gear 21 is rotated in one direction by the motor 20 to move the document support table 4 to the right from an exposure area E (FIG. 2). After the document 01 on the document support table 4 has been scanned to expose a photosensitive drum 16 to a document image formed by light from light sources 17 and transmitted via a convergent light transmitting array 18, the driver gear 21 is reversed to move back the document support table 4.

Figure 8:
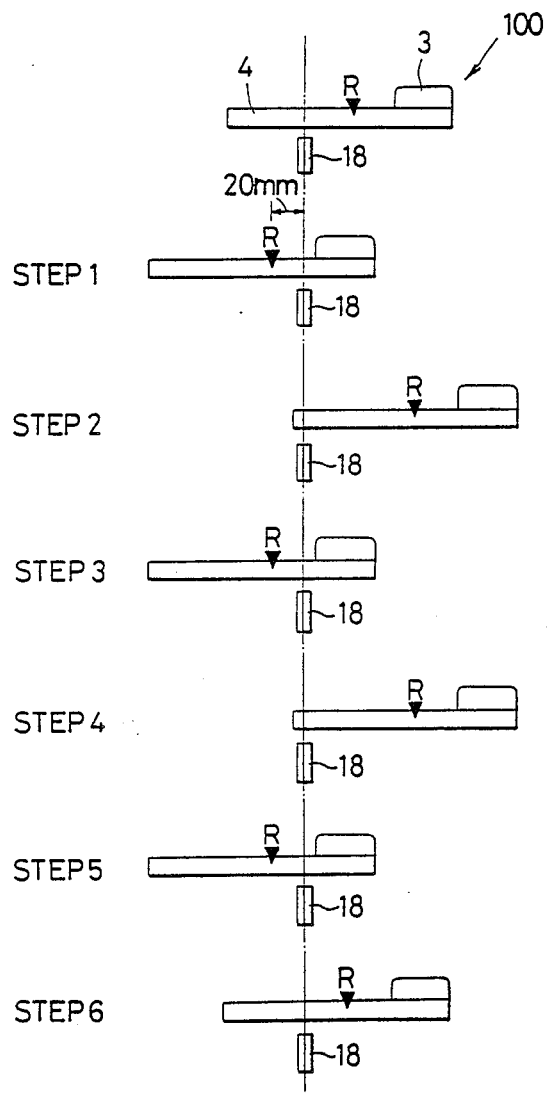
FIG. 8 is a view showing a succession of positions reached by the document support table of FIG. 2 during reciprocating movement thereof.

When a final document has been copied, the document support table 4 is stopped in an intermediate position shown in the uppermost level in FIG. 8. A mark R indicates the righhand end reference position of the document 01 in FIG. 2.

When a starting button (not shown) is depressed under this condition, the driver gear 21 is rotated to move the document support table 4 to the left. As the mark R is moved 20 mm to the left beyond the position of the convergent light transmitting array 18, the projection 41 of FIG. 5 hits the follower roller 35a of FIG. 4, turning the arm 35 to turn off the switch 37. A switching signal produced by the switch 37 is applied to a control unit (not shown) which then temporarily stops the rotation of the motor 20 (FIG. 7) to put a temporary end to the leftward movement of the document support table 4 (STEP 1).

Then, the motor 20 is reversed to enable the driver gear 21 to start moving the document support table 4 to the right. At the same time, an exposure scanning process is also initiated. The document support table 4 is stopped when it has moved to an exposure scanning completion position in which the lefthand end of the document has moved past the position of the convergent light transmitting array 18 (STEP 2).

When the same copy is to be successively made, the document support table 4 is moved back to the position of STEP 1 (STEP 3), and then moved to the right to the position of STEP 4 while another exposure scanning process is being carried out. At this time, the projection 42 of FIG. 5 engages the follower roller 36a of FIG. 4 to turn the arm 36, thus turning off the switch 38. The driver gear 21 now temporarily stops its rotation. The driver gear 21 is then reversed again to return the document support table 4. After a desired number of copies are produced, the document support table 4 is moved from the position of STEP 5 to the intermediate position of STEP 6.

The above operation is the mode of operation in which the document presser plate 2 is used (presser plate mode).

Another mode of operation in which the automatic document feeder 3 is used (ADF mode) will be described below. The scanning movable unit 100 is manually moved to the left until the driven gear 23 is brought into mesh with the driver gear 21, whereupon the scanning movable unit 100 is stopped. At this time, the projection 43 actuates the switch 39 which produces a signal for switching from the mode using the document presser plate 2 to the mode using the automatic document feeder 3.

A document stack 02 is now set in the position of FIG. 2. The starting button in the copying machine mechanism is depressed to energize the motor 20 to rotate the driver gear 21 counterclockwise (FIG. 3). The driven gear 23 is rotated by the driver gear 21 to enable the gears 24, 25, 26, 27, 6A, 28, 5A to rotate the delivery roller 5 and the separation roller 6.

The uppermost document of the document stack 02 is fed by the delivery roller 5 until the leading end of the document is pressed against the document support table 4 at the exposure area E. At this time, the first and second feed rollers 8, 9 remain stopped by the second one-way clutch 34. The driver gear 21 is stopped after it has rotated counterclockwise through a prescribed number of revolutions, and is subsequently rotated clockwise to cause the driver gear 23, the gears 24, 25, the second one-way clutch 34, and the gears 30, 8A, 9A to rotate the first and second feed rollers 8, 9 counterclockwise for thereby feeding the document from the position of the first feed roller 8. An exposure scanning process is simultaneously started to expose the photosensitive drum 16 to a document image which is formed as the document passes through the exposure area E. The rotation of the gear 30 is also transmitted to the gear 13A to rotate the discharging roller 13.

The peripheral speed of the first and second feed rollers 8, 9 is equalized to the speed of travel of the document support table 4 when it is moved from STEP 1 to STEP 2 (FIG. 8) in the presser plate mode. Therefore, the desired exposure process can be completed during a time period corresponding to the time period in which the document support table 4 is moved, i.e., through the revolutions of the driver gear 21 corresponding to those required for the document support table 4 to travel from STEP 1 to STEP 2. After the exposure process, the driver gear 21 is rotated through a number of revolutions required to discharge the document to be discharged into the tray 15, whereupon one copy is produced in the ADF mode. Upon completion of this mode, the driver gear 21 stops its rotation, and then is rotated counterclockwise again to feed a second document from the document stack 02. A plurality of documents are consecutively fed through the automatic document feeder 3 in this manner.

As described above, the motor 20 and the driver gear 21 constitute a common drive source. The rack 22 meshing with the driver gear 21 serves as the first power transmission system for transmitting driving power from the common drive source to the document support table 4 to reciprocally move the document support table 4 with respect to the exposure area E.

The gears shown in FIG. 7, except for the gear 21, serves as the second power transmission system for transmitting driving power from the common drive source to the automatic document feeder 3 to drive the document delivery and discharging systems and also to drive the document feeding system at the same speed as that of movement of the document support table 4 for passing a document through the exposure area E.

In the presser plate mode, it is necessary to move back the document support table 4, and for this reason only one copy can be produced on back-and-forth movement of the document support table 4. In the ADF mode, however, the document support table 4 is not required to be reciprocally moved, and copies can be produced highly efficiently at a rate substantially twice that in the presser plate mode.

With the driver gear 21 in the copying machine mechanism being used as a drive source for reciprocally moving the document support table 4 and also as a drive source for operating the automatic document feeder 3, the driver gear 21 is used as a common drive source shared by the first and second power transmission systems, resulting in a simpler driver construction than the conventional copying machines in which separate drive sources are employed to drive different power transmission systems.

Documents on the document support table 4 and in the automatic document feeder 3 are illuminated by light by the single exposure optical system positioned in the copying machine mechanism 1. Therefore, the exposure optical system is simple in construction, and the copying machine is made smaller in size and simpler in structure, resulting in a reduced cost of manufacture of the copying machine.

Since the copying machine is of a relatively simple structure, the number of parts required is reduced, so that the reliability of the copying machine is increased and the servicing thereof is simplified.

It is no longer necessary to employ an expensive electromagnetic clutch in the automatic document feeder 3 and to use cable connections in the automatic document feeder 3 which would otherwise be needed if a motor were required in the automatic document feeder 3.

Although a certain preferred embodiment has been shown and described, it should be understood that many changes and modifications may be made therein without departing from the scope of the appended claims.

What is claimed is:

1. A copying machine comprising:
   means defining an exposure area;
   a document support table reciprocally movably supported relative to said means defining an exposure area, whereby a document may be placed thereon;
   a document presser plate disposed on said document support table by means permitting opening and closing of said presser plate with respect to said document support table, whereby a document may be held on said document support table by said presser plate;
   an automatic document feeder disposed on said document support table and positioned out of an area in which said document presser plate is openable and closable with respect to said document support table, said automatic document feeder having a document delivery system, a document feeding system, and a document discharging system;
   a drive source;
   a first power transmission means for transmitting driving power from said drive source to said document support table for reciprocally moving the document support table with respect to said exposure area;
   a second power transmission means for transmitting driving power from said drive source to said automatic document feeder for actuating said document delivery and discharging systems and for actuating said document feeding system to feed a document at a speed equal to that of the reciprocal movement of said document support table, whereby a document may pass through said exposure area; and
   means for selectively drivingly communicating said drive source with one said first power transmission means in a first mode of using said document presser plate and said second power transmission means in a second mode of using said automatic document feeder, whereby said document presser plate is fixed in said second mode, wherein said means defining an exposure area includes a copying machine mechanism, said drive source including a driver gear disposed in said copying machine mechanism and rotatable selectively in opposite directions.

2. A copying machine according to claim 1, wherein said first power transmission means comprises a rack disposed on said document support table and capable of meshing with said driver gear in said first mode for reciprocally moving said document support table with respect to said exposure area.

3. A copying machine according to claim 1, wherein said second power transmission means includes a driven gear disposed on said automatic document feeder and capable of meshing with said driver gear in said second mode for actuating said document delivery and feeding systems.

4. A copying machine according to claim 1, further including means for switching from said first mode to said second mode when said automatic document feeder is in an operable position.

5. A copying machine according to claim 1, wherein said first and second power transmission means comprise means such that said automatic document feeder feeds a document in said second mode in a direction which is the same as the direction of movement of said document presser plate upon exposure in said first mode.

* * * * *

UNITED STATES PATENT AND TRADEMARK OFFICE
CERTIFICATE OF CORRECTION

PATENT NO. : 4,739,376
DATED     : Apr. 19, 1988
INVENTOR(S) : Tamaki KANEKO

It is certified that error appears in the above-identified patent and that said Letters Patent is hereby corrected as shown below:      Title page:

The correct spelling of the inventor's name is:

-- Tamaki Kaneko --

Signed and Sealed this

Twenty-third Day of August, 1988

Attest:

DONALD J. QUIGG

*Attesting Officer*          *Commissioner of Patents and Trademarks*